United States Patent
Nishio et al.

(10) Patent No.: US 9,391,756 B2
(45) Date of Patent: *Jul. 12, 2016

(54) WIRELESS COMMUNICATION BASE STATION EQUIPMENT, WIRELESS COMMUNICATION TERMINAL DEVICE AND SEARCH SPACE SETTING METHOD

(71) Applicant: Sun Patent Trust, New York, NY (US)

(72) Inventors: Akihiko Nishio, Osaka (JP); Seigo Nakao, Singapore (SG); Daichi Imamura, Beijing (CN); Masayuki Hoshino, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/973,525

(22) Filed: Dec. 17, 2015

(65) Prior Publication Data

US 2016/0105269 A1    Apr. 14, 2016

Related U.S. Application Data

(63) Continuation of application No. 14/595,136, filed on Jan. 12, 2015, now Pat. No. 9,246,657, which is a continuation of application No. 14/306,011, filed on Jun. 16, 2014, now Pat. No. 8,964,687, which is a continuation of application No. 13/122,950, filed as application No. PCT/JP2009/005791 on Oct. 30, 2009, now Pat. No. 8,787,275.

(30) Foreign Application Priority Data

Oct. 31, 2008   (JP) .................. 2008-281389

(51) Int. Cl.
*H04W 72/04*   (2009.01)
*H04L 5/00*    (2006.01)
*H04L 1/18*    (2006.01)

(52) U.S. Cl.
CPC ......... *H04L 5/0055* (2013.01); *H04W 72/0406* (2013.01)

(58) Field of Classification Search
None
See application file for complete search history.

(56) References Cited

U.S. PATENT DOCUMENTS

2010/0150081 A1    6/2010   Gao et al.
2011/0051681 A1*   3/2011   Ahn ................ H04L 5/0094
                                              370/330

(Continued)

FOREIGN PATENT DOCUMENTS

CN    101252783 A    8/2008
CN    101257369 A    9/2008

OTHER PUBLICATIONS

3GPP TS 36.211 V8.3.0, "Physical Channels and Modulation (Release 8)," May 2008, 77 pages.

(Continued)

*Primary Examiner* — Awet Haile
(74) *Attorney, Agent, or Firm* — Seed Intellectual Property Law Group PLLC

(57) ABSTRACT

Disclosed is wireless communication base station equipment in which CCE allocation can be flexibly performed without collision of ACK/NACK signals between a plurality of unit bands, even when wideband transmission is performed exclusively on a downlink circuit. In this equipment, an allocation unit (105) sets up mutually different search spaces for each of a plurality of downlink unit bands, with respect to wireless communication terminal devices that communicate using a plurality of downlink unit bands, and allocates resource allocation information of downlink circuit data destined for the wireless communication terminal devices to CCEs in mutually different search spaces for each of the plurality of downlink unit bands, and an ACK/NACK reception unit (119); extracts a response signal in respect of the downlink circuit data from the uplink control channel associated with the CCE to which the resource allocation information of this downlink circuit data was allocated.

24 Claims, 9 Drawing Sheets

(56) References Cited

U.S. PATENT DOCUMENTS

| | | | | |
|---|---|---|---|---|
| 2011/0141878 | A1* | 6/2011 | Che | H04L 1/0025 370/216 |
| 2012/0093097 | A1* | 4/2012 | Che | H04L 5/001 370/329 |
| 2012/0263134 | A1* | 10/2012 | Malladi | H04W 72/042 370/329 |
| 2012/0263143 | A1* | 10/2012 | Han | H04W 72/0453 370/330 |
| 2013/0044605 | A1* | 2/2013 | Lee | H04L 5/0007 370/241 |

OTHER PUBLICATIONS

3GPP TS 36.212 V8.3.0, "Multiplexing and Channel Coding (Release 8)," May 2008, 48 pages.

3GPP TS 36.213 V8.3.0, "Physical Layer Procedures (Release 8)," May 2008, 45 pages.

Ericsson, "Carrier Aggregation in LTE-Advanced," TSG-RAN WG1 #53bis, R1-082468, Warsaw, Poland, Jun. 30-Jul. 4, 2008, 6 pages.

Extended European Search Report, dated Feb. 17, 2014, for corresponding European Patent Application No. 09823347.1-1851 / 2352350, 12 pages.

Huawei, "DU/UL Asymmetric Carrier Aggregation," 3GPP TSG-RAN-WG1 Meeting #54bis, R1-083706, Prague, Czech Republic, Sep. 29-Oct. 3, 2008, 4 pages.

International Search Report dated Feb. 2, 2010, for corresponding International Application No. PCT/JP2009/005791, 2 pages.

NEC Group, "Detail on mapping between ACK/NACK index and CCE index," R1-074720, Agenda Item: 6.2.4, 3GPP TSG RAN WG1 Meeting #51, Jeju, Korea, Nov. 5-9, 2007, 4 pages.

Nokia, Nokia Siemens Networks, "L1 control signaling with carrier aggregation in LTE-Advanced," R1-083730, Agenda Item: 11, 3GPP TSG-RAN WG1 Meeting #54bis, Prague, Czech Republic, Sep. 29-Oct. 3, 2008, 8 pages.

NTT DoCoMo, "PDCCH Allocation Based on Hashing Function Generation Method for PDCCH Blind Decoding," R1-081406, Agenda Item: 6.1.3, 3GPP TSG RAN WG1 Meeting #52bis, Shenzhen, China, Mar. 31-Apr. 4, 2008, 4 pages.

NTT DoCoMo, "DL Layered Control Signal Structure in LTE-Advanced," R1-083681, Agenda Item: 11, 3GPP TSG RAN WG1 Meeting #54bis, Prague, Czech Republic, Sep. 29-Oct. 3, 2008, 4 pages.

Panasonic, "Support of UL/DL Asymmetric Carrier Aggregation," 3GPP TSG RAN WG1 Meeting #54, R1-082999, Jeju, Korea, Aug. 18-22, 2008, 3 pages.

Texas Instruments, "Issues on the choice of Clustered DFT-S-OFDMA versus NX-SCFDMA," R1-083948, Agenda Item: 11, 3GPP TSG RAN WG1 54bis, Prague, Czech Republic, Sep. 29-Oct. 3, 2008, 9 pages.

Nokia Corporation, Nokia Siemens Networks, Motorola, RAN 1, "PDCCH blind decoding" R1-083938, 3GPP TSG-RAN1 Meeting #54 bis, Prague, Czech Republic, Sep. 29,-Oct. 3, 2008, 2 pages.

Catt, R1, "PDCCH search space," R1-083621, 3GPP TSG RAN1 Meeting #54bis, Prague, Czech Republic, Sep. 29,-Oct. 3, 2008, 2 pages.

* cited by examiner

WIRELESS COMMUNICATION BASE STATION EQUIPMENT, WIRELESS COMMUNICATION TERMINAL DEVICE AND SEARCH SPACE SETTING METHOD

BACKGROUND

1. Technical Field

The present invention relates to a radio communication base station apparatus, a radio communication terminal apparatus and a search space setting method.

2. Description of the Related Art

3GPP-LTE (3rd Generation Partnership Project Radio Access Network Long Term Evolution, hereinafter referred to as "LTE") adopts OFDMA (Orthogonal Frequency Division Multiple Access) as a downlink communication scheme and adopts SC-FDMA (Single Carrier Frequency Division Multiple Access) as an uplink communication scheme (e.g., see non-patent literatures 1, 2 and 3).

According to LTE, a radio communication base station apparatus (hereinafter abbreviated as "base station") performs communication by allocating resource blocks (RBs) in a system band to a radio communication terminal apparatus (hereinafter abbreviated as "terminal") per time unit called "subframe." Furthermore, the base station transmits control information for notifying results of resource allocation of downlink data and uplink data to the terminal. This control information is transmitted to the terminal using a downlink control channel such as PDCCH (Physical Downlink Control Channel). Here, each PDCCH occupies a resource made up of one or a plurality of continuous CCEs (Control Channel Elements). LTE supports a frequency band having a width of maximum 20 MHz as a system bandwidth.

Furthermore, the base station simultaneously transmits a plurality of PDCCHs to allocate a plurality of terminals to one subframe. In this case, the base station includes CRC bits masked (or scrambled) with destination terminal IDs to identify the respective PDCCH destination terminals in the PDCCHs and transmits the PDCCHs. The terminal demasks (or descrambles) the CRC bits in a plurality of PDCCHs which may be directed to the terminal with the terminal ID of the terminal and thereby blind-decodes the PDCCHs and detects a PDCCH directed to the terminal.

Furthermore, studies are being carried out on a method of limiting CCEs to be subjected to blind decoding for each terminal for the purpose of reducing the number of times blind decoding is performed at the terminal. This method limits a CCE area to be subjected to blind decoding (hereinafter referred to as "search space") for each terminal. Thus, each terminal needs to perform blind decoding only on CCEs in a search space allocated to the terminal, and can thereby reduce the number of times blind decoding is performed. Here, the search space of each terminal is set using the terminal ID of each terminal and a hash function which is a function for performing randomization.

Furthermore, as for downlink data from the base station to the terminal, the terminal feeds back an ACK/NACK signal indicating an error detection result of the downlink data to the base station. The ACK/NACK signal is transmitted to the base station using an uplink control channel such as PUCCH (Physical Uplink Control Channel). Here, studies are being carried out on associating CCEs with a PUCCH to eliminate the necessity of signaling for notifying the PUCCH used to transmit an ACK/NACK signal from the base station to each terminal and thereby efficiently use downlink communication resources. Each terminal can decide a PUCCH used to transmit an ACK/NACK signal from the terminal from the CCE to which control information directed to the terminal is mapped. The ACK/NACK signal is a 1-bit signal indicating ACK (no error) or NACK (error present), and is BPSK-modulated and transmitted.

Furthermore, standardization of 3GPP LTE-Advanced (hereinafter referred to as "LTE-A") has been started which realizes further speed enhancement of communication compared to LTE. LTE-A is expected to introduce a base station and a terminal (hereinafter referred to as "LTE+ terminal") communicable at a wideband frequency of 40 MHz or above to realize a downlink transmission rate of maximum 1 Gbps or above and an uplink transmission rate of maximum 500 Mbps or above. Furthermore, the LTE-A system is required to accommodate not only an LTE+ terminal but also terminals compatible with the LTE system.

LTE-A proposes a band aggregation scheme whereby communication is performed by aggregating a plurality of frequency bands to realize communication in a wideband of 40 MHz or above (e.g., see non-patent literature 1). For example, a frequency band having a bandwidth of 20 MHz is assumed to be a basic unit (hereinafter referred to as "component band." Therefore, LTE-A realizes a system bandwidth of 40 MHz by aggregating two component bands.

Furthermore, according to LTE-A, the base station may notify resource allocation information of each component band to the terminal using a downlink component band of each component band (e.g., non-patent literature 4). For example, a terminal carrying out wideband transmission of 40 MHz (terminal using two component bands) obtains resource allocation information of two component bands by receiving a PDCCH arranged in the downlink component band of each component band.

Furthermore, according to LTE-A, the amounts of data transmission on an uplink and downlink are assumed to be independent of each other. For example, there may be a case where wideband transmission (communication band of 40 MHz) is performed on a downlink and narrow band transmission (communication band of 20 MHz) is performed on an uplink. In this case, the terminal uses two downlink component bands on the downlink and uses only one uplink component band on the uplink. That is, asymmetric component bands are used for the uplink and downlink (e.g., see non-patent literature 5). In this case, both ACK/NACK signals corresponding to downlink data transmitted with the two downlink component bands are transmitted to the base station using ACK/NACK resources arranged on a PUCCH of one uplink component band.

CITATION LIST

Non-Patent Literature

NPL 1
3GPP TS 36.211 V8.3.0, "Physical Channels and Modulation (Release 8)," May 2008
NPL 2
3GPP TS 36.212 V8.3.0, "Multiplexing and channel coding (Release 8)," May 2008
NPL 3
3GPP TS 36.213 V8.3.0, "Physical layer procedures (Release 8)," May 2008
NPL 4
3GPP TSG RAN WG1 meeting, R1-082468, "Carrier aggregation LTE-Advanced," July 2008
NPL 5
3GPP TSG RAN WG1 meeting, R1-083706, "DL/UL Asymmetric Carrier aggregation," September 2008

BRIEF SUMMARY

Technical Problem

When a plurality of downlink component bands and uplink component bands fewer than the plurality of downlink component bands are used as in the above described prior art (when asymmetric component bands are used between the uplink and downlink), it is necessary to secure PUCCHs (ACK/NACK resources) to allocate ACK/NACK signals corresponding to downlink data for each of the plurality of downlink component bands for the uplink component bands. When PUCCHs (ACK/NACK resources) associated with CCEs for each of all downlink component bands are secured, the amount of resources required for the PUCCHs becomes enormous in the uplink component bands. Therefore, the amount of resources secured for uplink resources (e.g., PUSCH (Physical Uplink Shared Channel)) to which uplink data of the terminal is allocated decreases, and therefore data throughput deteriorates.

Thus, a PUCCH (ACK/NACK resource) arranged in one uplink component band may be shared between a plurality of downlink component bands, that is, one PUCCH (ACK/NACK resource) may be secured for all component bands. To be more specific, PUCCHs corresponding in number to CCEs per downlink component band (or maximum number of CCEs between a plurality of downlink component bands) are secured for the uplink component bands. CCEs of the same CCE number of each downlink component band are then associated with the same PUCCH. Thus, the terminal transmits an ACK/NACK signal corresponding to downlink data using a PUCCH (ACK/NACK resource) associated with a CCE regardless of the CCE of the downlink component band with which the downlink data is allocated.

A case will be described as an example where the terminal uses two component bands (component band 1 and component band 2). When performing wideband transmission (e.g., communication band of 40 MHz) only on a downlink, the terminal uses, for example, downlink component bands of both component band 1 and component band 2 on the downlink, while on an uplink, the terminal uses only an uplink component band of component band 1 without using an uplink component band of component band 2. Furthermore, here, CCEs assigned the same CCE number (e.g., CCE #1, #2, . . . ) are arranged in the two downlink component bands so as to be able to accommodate LTE terminals. Furthermore, in the uplink component band, for example, PUCCH #1 associated with CCE #1 and PUCCH #2 associated with CCE #2 are arranged. Thus, CCEs #1 of the same CCE number arranged in the downlink component band of component band 1 and the downlink component band of component band 2 respectively are commonly associated with PUCCH #1. Likewise, CCEs #2 of the same CCE number arranged in the downlink component band of component band 1 and the downlink component band of component band 2 respectively are commonly associated with PUCCH #2. This makes it possible to prevent data throughput from deteriorating without increasing the amount of resources required for a control channel in the uplink component band. Furthermore, when consideration is given to a case where a PDCCH may be configured using a plurality of CCEs for each terminal or a PDCCH including allocation information of uplink data may be configured using CCEs (that is, when transmission of an ACK/NACK signal in the terminal is unnecessary), the probability that all PUCCHs arranged in the uplink component band will be used simultaneously is low. Thus, sharing a PUCCH between a plurality of component bands makes it possible to improve resource utilization efficiency of the PUCCH.

However, according to the method of sharing a PUCCH arranged in one uplink component band between a plurality of downlink component bands, CCE allocation to each terminal is limited to avoid collision between ACK/NACK signals at the base station. For example, an ACK/NACK signal corresponding to downlink data allocated using a PDCCH made up of CCE #1 of a downlink component band of component band 1 is allocated to PUCCH #1 associated with CCE #1. Therefore, when CCE #1 is used for allocation of downlink data in the downlink component band of component band 2, collision occurs between component band 2 and component band 1 in PUCCH #1. For this reason, the base station can no longer allocate CCE #1 in component band 2. Furthermore, as described above, since an available CCE area (search space) is set for each terminal, CCEs to which a PDCCH directed to each terminal is allocated are further limited.

Particularly, the greater the number of downlink component bands set in the terminal, the lower is the degree of freedom of CCE allocation to the terminal in the base station. For example, a case will be described where a search space made up of six CCEs is set for a terminal using five downlink component bands and one uplink component band. When a PDCCH is used in 1 CCE units, there are six CCE allocation candidates directed to the terminal in a search space of each downlink component band. Here, when two CCEs of the six CCEs in the search space are allocated to a PDCCH directed to another terminal, four CCEs (remaining CCEs in the search space) can be allocated to the terminal. Therefore, the PDCCH can no longer be allocated to all of five downlink component bands. Furthermore, since a control channel showing broadcast information having higher priority (e.g., BCH: Broadcast Channel) may be allocated to CCEs of the downlink component band, the number of CCEs that can be allocated in the search space further decreases in this case, and data transmission is thereby limited.

It is therefore an object of the present invention to provide a base station, a terminal and a search space setting method capable of flexibly allocating CCEs without ACK/NACK signals colliding between a plurality of component bands even when performing wideband transmission on only a downlink.

Solution to Problem

A base station of the present invention adopts a configuration including an allocation section that sets different search spaces for a plurality of downlink component bands in a radio communication terminal apparatus that communicates using the plurality of downlink component bands and allocates resource allocation information of downlink data directed to the radio communication terminal apparatus to CCEs in the search space and a receiving section that extracts a response signal to the downlink data from an uplink control channel associated with the CCEs to which the resource allocation information is allocated.

A terminal of the present invention is a radio communication terminal apparatus that communicates using a plurality of downlink component bands and adopts a configuration including a receiving section that blind-decodes CCEs in different search spaces for the plurality of downlink component bands and obtains resource allocation information of downlink data directed to the radio communication terminal apparatus and a mapping section that maps a response signal to the downlink data to an uplink control channel associated with the CCEs to which the resource allocation information is allocated.

A search space setting method of the present invention sets different search spaces for a plurality of downlink component bands in a radio communication terminal apparatus that communicates using the plurality of downlink component bands.

Advantageous Effects of Invention

According to the present invention, even when wideband transmission is performed using only a downlink, CCEs can be flexibly allocated without ACK/NACK signals colliding between a plurality of component bands.

DETAILED DESCRIPTION

Figure 1:
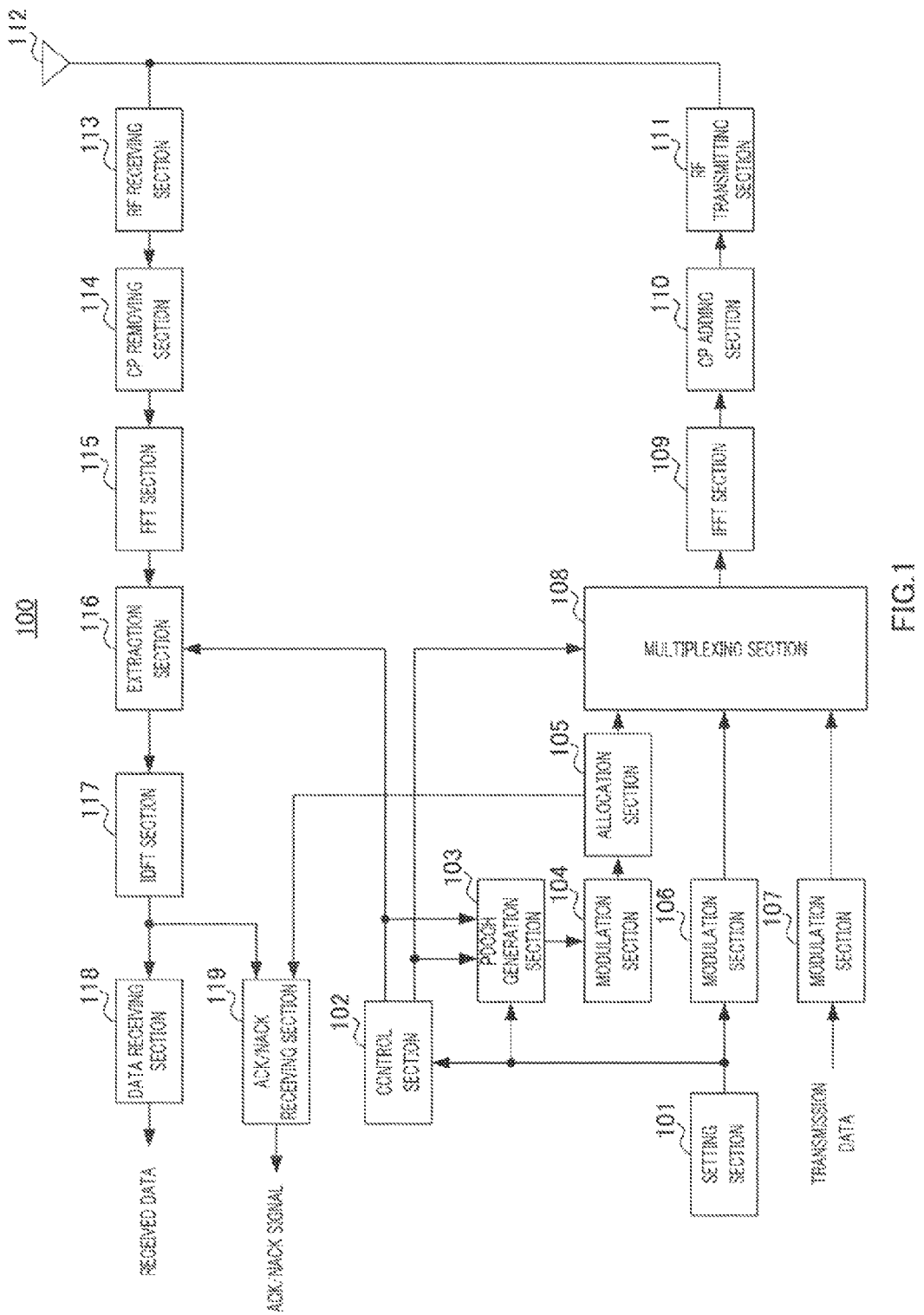
FIG. 1 is a block diagram illustrating a configuration of a base station according to Embodiment 1 of the present invention.

Hereinafter, embodiments of the present invention will be described in detail with reference to the accompanying drawings. The same components between embodiments will be assigned the same reference numerals and overlapping explanations will be omitted.

Embodiment 1

FIG. 1 is a block diagram illustrating a configuration of base station 100 according to the present embodiment.

In base station 100 shown in FIG. 1, setting section 101 sets (configures) one or a plurality of component bands to use for an uplink and a downlink per terminal according to a required transmission rate and amount of data transmission or the like. Setting section 101 then outputs setting information including the component band set in each terminal to control section 102, PDCCH generation section 103 and modulation section 106.

Control section 102 generates uplink resource allocation information indicating uplink resources (e.g., PUSCH) to which uplink data of a terminal is allocated and downlink resource allocation information indicating downlink resources (e.g., PDSCH (Physical Downlink Shared Channel)) to which downlink data directed to the terminal is allocated. Control section 102 then outputs the uplink resource allocation information to PDCCH generation section 103 and extraction section 116 and outputs the downlink resource allocation information to PDCCH generation section 103 and multiplexing section 108. Here, control section 102 allocates uplink resource allocation information and downlink resource allocation information to PDCCHs arranged in downlink component bands set in each terminal based on the setting information inputted from setting section 101. To be more specific, control section 102 allocates the downlink resource allocation information to PDCCHs arranged in the downlink component bands to be subjected to resource allocation indicated in the downlink resource allocation information. Furthermore, control section 102 allocates uplink resource allocation information to PDCCHs arranged in downlink component bands associated with the uplink component bands to be subjected to resource allocation indicated in the uplink allocation information. A PDCCH is made up of one or a plurality of CCEs.

PDCCH generation section 103 generates a PDCCH signal including the uplink resource allocation information and downlink resource allocation information inputted from control section 102. Furthermore, PDCCH generation section 103 adds a CRC bit to the PDCCH signal to which the uplink resource allocation information and downlink resource allocation information have been allocated and further masks (or scrambles) the CRC bit with the terminal ID. PDCCH generation section 103 then outputs the masked PDCCH signal to modulation section 104.

Modulation section 104 modulates the PDCCH signal inputted from PDCCH generation section 103 after channel coding and outputs the modulated PDCCH signal to allocation section 105.

Allocation section 105 allocates a PDCCH signal of each terminal inputted from modulation section 104 to CCEs in a search space per terminal. Here, allocation section 105 sets different search spaces for the plurality of downlink component bands in a terminal that communicates using a plurality of downlink component bands and uplink component bands which are fewer than the plurality of downlink component bands. For example, allocation section 105 calculates a search space for each of the plurality of downlink component bands set in each terminal from CCE number calculated using a terminal ID of each terminal and a hash function for performing randomization and the number of CCEs (L) making up the search space. Allocation section 105 then outputs the PDCCH signal allocated to the CCEs to multiplexing section 108. Furthermore, allocation section 105 outputs information indicating the CCE to which the PDCCH signal (resource allocation information) is allocated to ACK/NACK receiving section 119.

Modulation section 106 modulates the setting information inputted from setting section 101 and outputs the modulated setting information to multiplexing section 108.

Modulation section 107 modulates inputted transmission data (downlink data) after channel coding and outputs the modulated transmission data signal to multiplexing section 108.

Multiplexing section 108 multiplexes the PDCCH signal inputted from allocation section 105, the setting information inputted from modulation section 106 and the data signal (that is, PDSCH signal) inputted from modulation section 107. Here, multiplexing section 108 maps the PDCCH signal and data signal (PDSCH signal) to each downlink component band based on the downlink resource allocation information inputted from control section 102. Multiplexing section 108 may also map the setting information to a PDSCH. Multiplexing section 108 then outputs the multiplexed signal to IFFT (Inverse Fast Fourier Transform) section 109.

IFFT section 109 transforms the multiplexed signal inputted from multiplexing section 108 into a time waveform and CP (Cyclic Prefix) adding section 110 adds a CP to the time waveform and thereby obtains an OFDM signal.

RF transmitting section 111 applies radio transmitting processing (up-conversion, digital/analog (D/A) conversion or the like) to the OFDM signal inputted from CP adding section 110 and transmits the OFDM signal via antenna 112.

On the other hand, RF receiving section 113 applies radio receiving processing (down-conversion, analog/digital (A/D) conversion or the like) to the received radio signal received in a reception band via antenna 112 and outputs the received signal obtained to CP removing section 114.

CP removing section 114 removes a CP from the received signal and FFT (Fast Fourier Transform) section 115 transforms the received signal after the CP removal into a frequency domain signal.

Extraction section 116 extracts uplink data from the frequency domain signal inputted from FFT section 115 based on the uplink resource allocation information inputted from control section 102. IDFT (Inverse Discrete Fourier transform) section 117 then transforms the extracted signal into a time domain signal and outputs the time domain signal to data receiving section 118 and ACK/NACK receiving section 119.

Data receiving section 118 decodes the time domain signal inputted from IDFT section 117. Data receiving section 118 outputs the decoded uplink data as received data.

ACK/NACK receiving section 119 extracts an ACK/NACK signal from each terminal corresponding to downlink data (PDSCH signal) of the time domain signal inputted from IDFT section 117 from a PUCCH associated with a CCE used to allocate the downlink data. ACK/NACK receiving section 119 then makes an ACK/NACK decision on the extracted ACK/NACK signal. Here, when base station 100 (allocation section 105) allocates a PDCCH signal including downlink resource allocation information of downlink data (PDSCH signal) of a plurality of component bands to CCEs of downlink component bands of a plurality of component bands, ACK/NACK receiving section 119 extracts a plurality of ACK/NACK signals from PUCCHs associated with CCE numbers of the respective CCEs.

Figure 2:
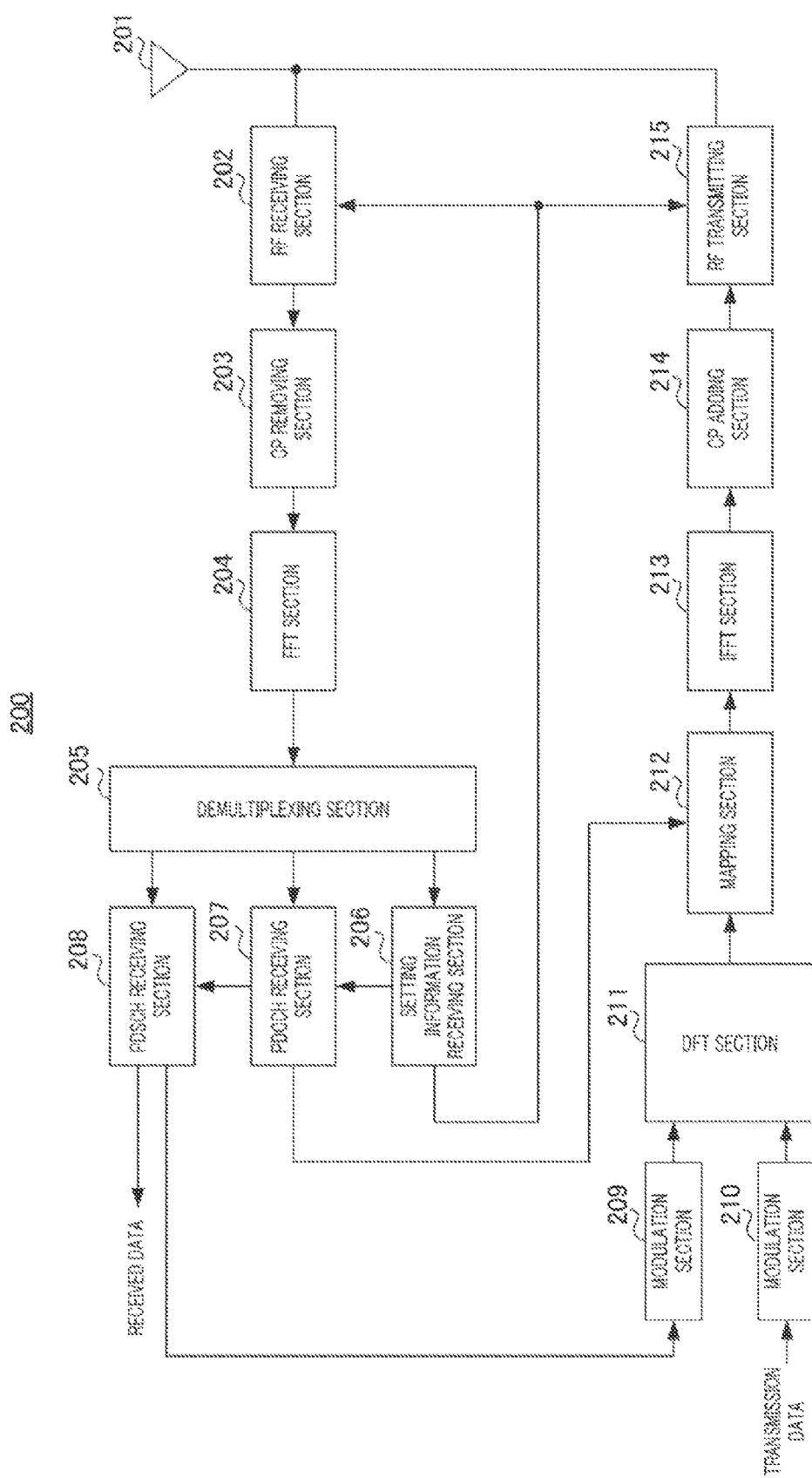
FIG. 2 is a block diagram illustrating a configuration of a terminal according to Embodiment 1 of the present invention.

FIG. 2 is a block diagram illustrating a configuration of terminal 200 according to the present embodiment. Terminal 200 receives a data signal (downlink data) using a plurality of downlink component bands and transmits an ACK/NACK signal for the data signal to base station 100 using a PUCCH of one uplink component band.

In terminal 200 shown in FIG. 2, RF receiving section 202 is configured to be able to change a reception band and changes the reception band based on band information inputted from setting information receiving section 206. RF receiving section 202 applies radio receiving processing (down-conversion, analog/digital (A/D) conversion or the like) to the received radio signal (here, OFDM signal) received in the reception band via antenna 201 and outputs the received signal obtained to CP removing section 203.

CP removing section 203 removes a CP from the received signal and FFT section 204 transforms the received signal after the CP removal into a frequency domain signal. The frequency domain signal is outputted to demultiplexing section 205.

Demultiplexing section 205 demultiplexes the signal inputted from FFT section 204 into a control signal (e.g., RRC signaling) of a higher layer including setting information, PDCCH signal and data signal (that is, PDSCH signal). Demultiplexing section 205 outputs the control information to setting information receiving section 206, outputs the PDCCH signal to PDCCH receiving section 207 and outputs the PDSCH signal to PDSCH receiving section 208.

Setting information receiving section 206 reads information indicating uplink component bands and downlink component bands set in the terminal from the control signal inputted from demultiplexing section 205 and outputs the read information to PDCCH receiving section 207, RF receiving section 202 and RF transmitting section 215 as band information. Furthermore, setting information receiving section 206 reads information indicating the terminal ID set in the terminal from the control signal inputted from demultiplexing section 205 and outputs the read information to PDCCH receiving section 207 as terminal ID information.

PDCCH receiving section 207 blind-decodes the PDCCH signal inputted from demultiplexing section 205 and obtains a PDCCH signal directed to the terminal. Here, the PDCCH signal is allocated to each CCE (that is, PDCCH) arranged in the downlink component band set in the terminal indicated in the band information inputted from setting information receiving section 206. To be more specific, PDCCH receiving section 207 calculates a search space of the terminal using the terminal ID of the terminal indicated in the terminal ID information inputted from setting information receiving section 206. The search space (CCE numbers of CCEs constituting the search space) calculated here differs between the plurality of downlink component bands set in the terminal. PDCCH receiving section 207 then demodulates and decodes the PDCCH signal allocated to each CCE in the calculated search space. PDCCH receiving section 207 demasks a CRC bit with the terminal ID of the terminal indicated in the terminal ID information for the decoded PDCCH signal and thereby decides the PDCCH signal which results in CRC=OK (no error) to be a PDCCH signal directed to the terminal. PDCCH receiving section 207 performs the above described blind decoding on each component band to which a PDCCH signal has been transmitted and thereby acquires resource allocation information of the component band. PDCCH receiving section 207 outputs downlink resource allocation information included in the PDCCH signal directed to the terminal to PDSCH receiving section 208 and outputs uplink resource allocation information to mapping section 212. Furthermore, PDCCH receiving section 207 outputs the CCE number of the CCE (CCE resulting in CRC=OK) from which the PDCCH signal directed to the terminal is detected to mapping section 212.

PDSCH receiving section 208 extracts received data (downlink data) from the PDSCH signal inputted from demultiplexing section 205 based on the downlink resource allocation information inputted from PDCCH receiving section 207. Furthermore, PDSCH receiving section 208 performs error detection on the extracted received data (downlink data). When the error detection result shows that an error is detected in the received data, PDSCH receiving section 208 generates an NACK signal as the ACK/NACK signal and generates an ACK signal as the ACK/NACK signal when no error is detected in the received data. PDSCH receiving section 208 then outputs the ACK/NACK signal to modulation section 209.

Modulation section 209 modulates the ACK/NACK signal inputted from PDSCH receiving section 208 and outputs the modulated ACK/NACK signal to DFT (Discrete Fourier transform) section 211.

Modulation section 210 modulates the transmission data (uplink data) and outputs the modulated data signal to DFT section 211.

DFT section 211 transforms the ACK/NACK signals inputted from modulation section 209 and the data signal inputted from modulation section 210 into a frequency domain signal and outputs a plurality of frequency components obtained to mapping section 212.

Mapping section 212 maps the frequency component corresponding to the data signal out of the plurality of frequency components inputted from DFT section 211 to a PUSCH arranged in the uplink component band according to the uplink resource allocation information inputted from PDCCH receiving section 207. Furthermore, mapping section 212 maps the frequency components or code resources corresponding to the ACK/NACK signals out of the plurality of frequency components inputted from DFT section 211 to a PUCCH arranged in the uplink component band according to the CCE number inputted from PDCCH receiving section 207.

Figure 3:
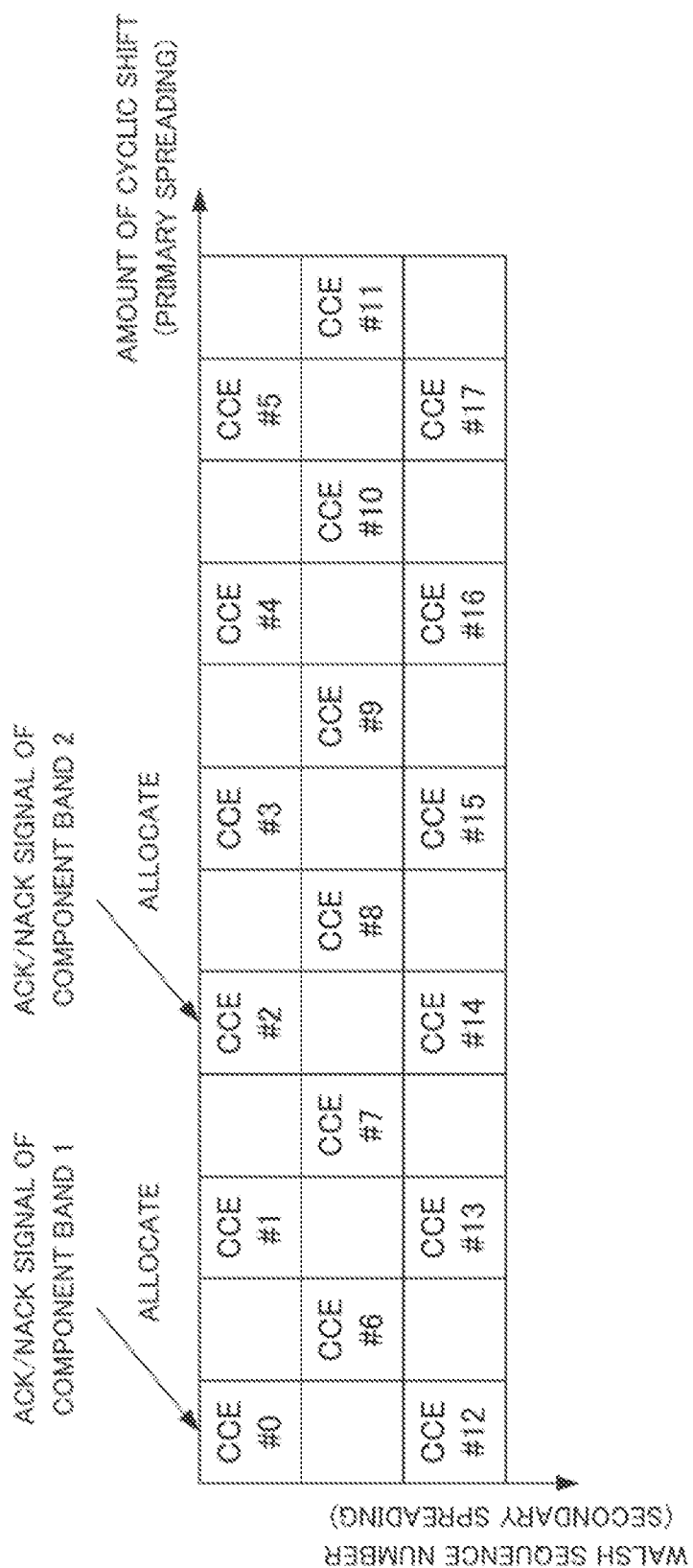
FIG. 3 is a diagram illustrating PUCCH resources associated with each CCE according to Embodiment 1 of the present invention.

For example, as shown in FIG. 3, PUCCH resources are defined using a primary spreading sequence (amount of cyclic shift of ZAC (Zero Auto Correlation) sequence) and a secondary spreading sequence (block-wise spread code) such as Walsh sequence). That is, mapping section 212 allocates ACK/NACK signals to primary spreading sequences and secondary spreading sequences associated with the CCE numbers inputted from PDCCH receiving section 207. Furthermore, the PUCCH shown in FIG. 3 is shared between a plurality of downlink component bands. Thus, when PDSCH signals are transmitted in a plurality of downlink component bands, mapping section 212 allocates ACK/NACK signals corresponding to the PDSCH signals transmitted in the respective downlink component bands to PUCCH resources associated with the CCE numbers of CCEs used for allocation of the PDSCH signals. For example, an ACK/NACK signal corresponding to a PDSCH signal allocated using CCE #0 of a downlink component band of component band 1 is allocated to a PUCCH resource corresponding to CCE #0 shown in FIG. 3. Likewise, an ACK/NACK signal corresponding to a PDSCH signal allocated using CCE #2 of a downlink component band of component band 2 is allocated to a PUCCH resource corresponding to CCE #2 shown in FIG. 3.

Modulation section 209, modulation section 210, DFT section 211 and mapping section 212 may be provided for each component band.

IFFT section 213 transforms a plurality of frequency components mapped to the PUSCH into a time domain waveform and CP adding section 214 adds a CP to the time domain waveform.

RF transmitting section 215 is configured to be able to change a transmission band and sets a transmission band based on the band information inputted from setting information receiving section 206. RF transmitting section 215 then applies radio transmitting processing (up-conversion, digital/analog (D/A) conversion or the like) to the CP-added signal and transmits the signal via antenna 201.

Next, details of operations of base station 100 and terminal 200 will be described.

Figure 4:
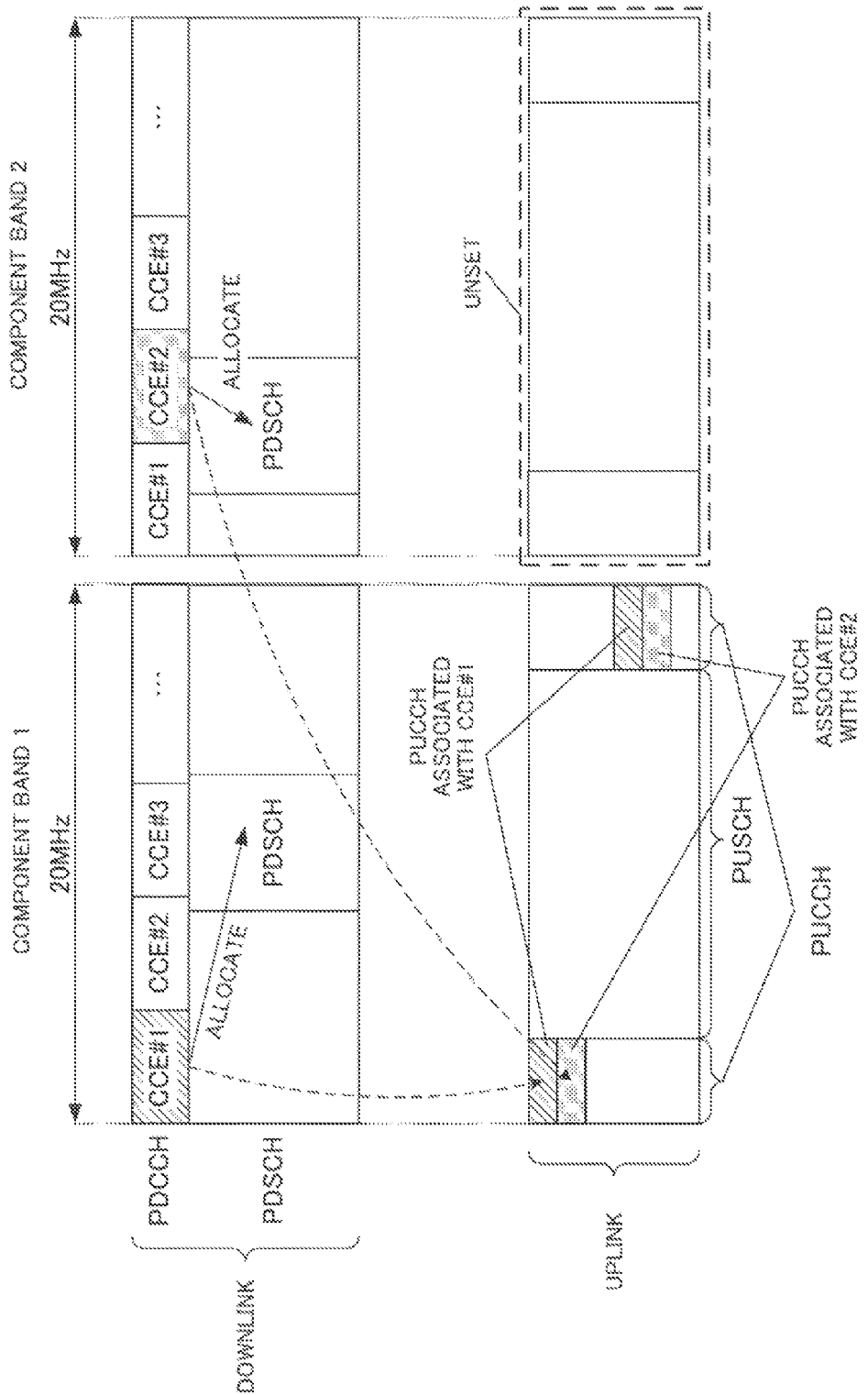
FIG. 4 is a diagram illustrating component bands set in the terminal according to Embodiment 1 of the present invention.

In the following descriptions, setting section 101 (FIG. 1) of base station 100 sets two downlink component bands (component band 1 and component band 2) and one uplink component band (component band 1) in terminal 200 as shown in FIG. 4. That is, as shown in FIG. 4, setting section 101 sets both the uplink component band and the downlink component band for component band 1 in terminal 200, while for component band 2, setting section 101 does not set any uplink component band (unset) but sets only the downlink component band. That is, base station 100 communicates with terminal 200 using two downlink component bands and one uplink component band, which is one component band fewer than the downlink component bands.

Furthermore, as shown in FIG. 4, the PDCCH arranged in each downlink component band is made up of a plurality of CCEs (CCE #1, CCE #2, CCE #3, . . . ). Furthermore, as shown in FIG. 4, component band 1 and component band 2 share PUCCHs (e.g., FIG. 3) arranged in the uplink component band of component band 1. Thus, terminal 200 transmits an ACK/NACK signal to base station 100 using a PUCCH arranged in the uplink component band of component band 1 associated with the CCE used to allocate the PDSCH signal regardless of the component band in which the PDSCH signal has been received.

Here, allocation section 105 allocates a PDCCH signal including downlink resource allocation information to CCEs in such a way that PUCCHs (ACK/NACK resources) for ACK/NACK signals do not collide between a plurality of downlink component bands. For example, as shown in FIG. 4, a PDCCH signal including downlink resource allocation information (that is, information indicating PDSCH allocation of component band 1) of component band 1 is allocated to CCE #1 of the downlink component band of component band 1. In this case, allocation section 105 allocates a PDCCH signal including downlink resource allocation information (that is, information indicating PDSCH allocation of component band 2) of component band 2 to a CCE other than CCE #1 (CCE #2 in FIG. 4) in the downlink component band of component band 2. On the other hand, when a PDCCH signal including downlink resource allocation information of component band 1 is allocated to a CCE, allocation section 105 allocates a PDCCH signal including downlink resource allocation information of component band 1 to a CCE other than CCE #2 used in the downlink component band of component band 2. Here, the other terminal in which the uplink component band of component band 2 (unset in terminal 200) is set uses a PUCCH arranged in the uplink component band of component band 2 to transmit an ACK/NACK signal to base station 100. Thus, in the PUCCH arranged in the uplink component band of component band 1, no collision occurs between terminal 200 and the other terminal. For this reason, in the downlink component band of component band 2, allocation section 105 may allocate the PDCCH signal including downlink resource allocation information directed to the other terminal to CCE #1 used in component band 1 (not shown).

Furthermore, allocation section 105 sets different search spaces for the plurality of component bands (component band 1 and component band 2 in FIG. 4) set in terminal 200. That is, allocation section 105 sets a plurality of search spaces according to the number of component bands set in terminal 200. Allocation section 105 then allocates the PDCCH signal directed to terminal 200 to CCEs in the search space set for each component band. Hereinafter, methods 1 and 2 of setting a search space in allocation section 105 will be described.

<Setting Method 1 (FIG. 5)>

In the present setting method, allocation section 105 sets different search spaces for every plurality of component bands so that the search spaces of the plurality of component bands set in each terminal neighbor each other.

To be more specific, allocation section 105 calculates CCE number $S_n$ which is a start position of the search space of n-th component band n (n=1, 2, . . . ) from calculation expression h ($N_{UEID}$) mod $N_{CCE,n}$ first. Allocation section 105 then sets CCEs of CCE numbers $S_n$ to ($S_n$+(L−1)) mod $N_{CCE,n}$ as the search space of component band n. Here, calculation expression h(x) is a hash function for performing randomization assuming input data as x, $N_{UEID}$ is terminal ID set in terminal 200, $N_{CCE,n}$ is the total number of CCEs of component band n and L is the number of CCEs making up a search space. Furthermore, operator "mod" represents a modulo calculation and when the CCE number calculated from each relational expression is greater than the total number of CCEs of each component band, mod is returned to initial CCE number 0 through a modulo calculation. The same applies to the following relational expressions. That is, allocation section 105 sets L consecutive CCEs from the start position of the search space as a search space of component band n of terminal 200.

Next, allocation section 105 sets CCE number $S_{n+1}$ which is the start position of the search space of (n+1)-th component band (n+1) in ($S_n$+L) mod $N_{CCE,n}$. Allocation section 105 sets CCEs of CCE numbers $S_{n+1}$ to ($S_{n+1}$+(L−1)) mod $N_{CCE,n+1}$ as a search space of component band (n+1).

Thus, CCE number ($S_n$+(L−1)) mod $N_{CCE,n}$ which is the end position of the search space of component band n and CCE number ($S_n$+L) mod $N_{CCE,n}$ which is the start position of the search space of component band (n+1) are consecutive CCE numbers. That is, the search space of component band n and the search space of component band (n+1) are made up of CCEs of different CCE numbers and further the search space of component band n and the search space of component band (n+1) are neighboring each other.

Figure 5:
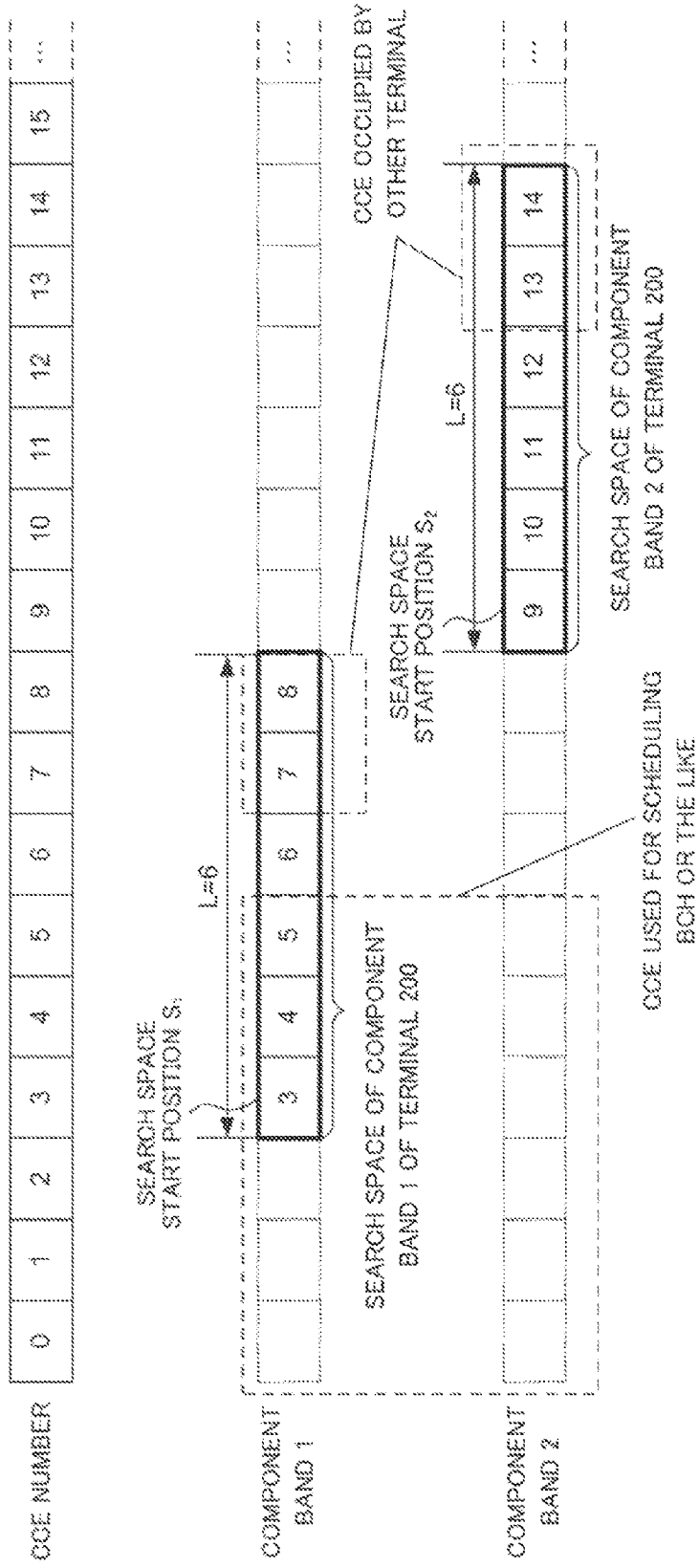
FIG. 5 is a diagram illustrating a method of setting a search space of each component band according to Embodiment 1 of the present invention.

To be more specific, as shown in FIG. 5, a case will be described where CCE number $S_1$ which is the start position of the search space of component band 1 is calculated to be CCE #3 from hash function h($N_{UEID}$) mod $N_{CCE,n}$. Here, a case will be described where assuming the number of CCEs L making up a search space is 6 and the total number of CCEs of component band 1 $N_{CCE,1}$ and the total number of CCEs of component band 2 $N_{CCE,2}$ are more than 15 (that is, when the modulo calculation is not taken into consideration in FIG. 5).

Thus, as shown in FIG. 5, allocation section 105 sets CCEs #3 to #8 (=(3+(6−1)) mod $N_{CCE,1}$) as the search space of component band 1. Furthermore, as shown in FIG. 5, allocation section 105 sets the CCE number of the start position of the search space of component band 2 to #9(=(3+6) mod $N_{CCE,n}$) and sets CCEs #9 to #14 (=(9+(6−1)) mod $N_{CCE,2}$) as the search space of component band 2.

As shown in FIG. 5, the search space (CCEs #3 to #8) of component band 1 and search space (CCEs #9 to #14) of component band 2 are made up of CCEs of different CCE numbers. Furthermore, the search space (CCEs #3 to #8) of component band 1 and search space (CCEs #9 to #14) of component band 2 are neighboring each other.

On the other hand, as with allocation section 105, PDCCH receiving section 207 of terminal 200 identifies the search space of component band 1 (CCEs #3 to #8 shown in FIG. 5) and the search space of component band 2 (CCEs #9 to #14 shown in FIG. 5) based on $N_{UEID}$ which is terminal ID of terminal 200. PDCCH receiving section 207 then blind-decodes only CCEs in the identified search space of each component band.

Furthermore, mapping section 212 maps an ACK/NACK signal for a PDSCH signal (downlink data) allocated using CCEs of a downlink component band of each component band to a PUCCH associated with the CCEs. For example, in FIG. 5, mapping section 212 maps the ACK/NACK signal corresponding to the PDSCH signal allocated using one of CCEs #3 to 8 of component band 1 to a PUCCH associated with CCEs #3 to #8 (e.g., PUCCHs #3 to #8 (not shown)). On the other hand, in FIG. 5, mapping section 212 maps the ACK/NACK signal corresponding to the PDSCH signal allocated using one of CCEs #9 to 14 of component band 2 to a PUCCH associated with CCEs #9 to #14 (e.g., PUCCHs #9 to #14 (not shown)).

Thus, mapping section 212 maps the ACK/NACK signal corresponding to a PDSCH signal allocated using CCEs of a downlink component band of each component band to a PUCCH which differs from one component band to another. That is, no collision of ACK/NACK signal occurs between component band 1 and component band 2 set in terminal 200.

Furthermore, as shown in FIG. 5, suppose, for example, CCEs #0 to #5 of both component band 1 and component band 2 are used for scheduling of BCH or the like and CCEs #7 and #8 of component band 1 and CCEs #13 and #14 of component band 2 are used for terminals other than terminal 200. In this case, only CCE #6 can be allocated to terminal 200 within the search space set in component band 1. Thus, allocation section 105 allocates a PDCCH signal including resource allocation information of component band 1 directed to terminal 200 to CCE #6. On the other hand, CCEs #9 to #12 can be allocated within the search space set in component band 2. Thus, allocation section 105 can allocate a PDCCH signal including resource allocation information of component band 2 directed to terminal 200 to one of CCEs #9 to #12.

That is, in the downlink component band of component band 2, base station 100 can allocate a PDCCH signal to CCEs without limitation of CCE allocation in the downlink component band of component band 1 (limitation that only CCE #6 can be allocated in FIG. 5). That is, base station 100 sets different search spaces for the plurality of downlink component bands set in one terminal. Thus, in the downlink component band of each component band set in terminal 200, it is possible to perform CCE allocation in each downlink component band without being limited by CCE allocation of other different component bands set in terminal 200. This allows base station 100 to reduce the possibility that a PDCCH signal not being allocated to CCEs may limit data transmission.

Thus, according to the present setting method, the base station sets different search spaces for the plurality of downlink component bands set in the terminal. Thus, the terminal can map an ACK/NACK signal corresponding to a PDSCH signal (downlink data) allocated using CCEs (PDCCH) of different downlink component bands to different PUCCHs for the plurality of component bands. Therefore, even when wideband transmission is performed only on the downlink, that is, when narrowband transmission is performed on the uplink, the base station can allocate PDCCH signals to CCEs including resource allocation information without causing collision of ACK/NACK signals to occur between component bands. Therefore, according to the present setting method, it is possible to flexibly allocate CCEs without causing collision of ACK/NACK signals to occur between a plurality of component bands even when wideband transmission is performed only on the downlink.

Furthermore, according to the present setting method, search spaces for the plurality of component bands set in the terminal are neighboring each other. This allows the base station to set search spaces without spacing between CCEs used between a plurality of component bands set in the terminal. For this reason, when, for example, the total number of CCEs per component band is small or when the number of downlink component bands set in the terminal is large, the search space of another component band (e.g., component band 2 shown in FIG. 5) set based on the search space of the component band that serves as a reference (e.g., component band 1 shown in FIG. 5) is repeatedly set from the last CCE to the start CCE. This makes it possible to reduce the possibility that the other search space will overlap the search space of the reference component band (component band 1 shown in FIG. 5).

<Setting Method 2 (FIG. 6)>

The present setting method will cause CCE spacing between search space start positions of the plurality of component bands set in each terminal (that is, offset of search space start positions) to differ between a plurality of terminals.

As described above, according to setting method 1, search spaces of component bands from other component band 2 (or component band (n+1)) onward are set based on the start position of the search space of component band 1 (or component band n).

Furthermore, setting method 1 in FIG. 5 randomly sets the start position (CCE number) of the search space of component band 1 based on a hash function which receives terminal ID of each terminal as input. Therefore, between a plurality of terminals in which component band 1 is set, the start positions of search spaces of component band 1 set based on a hash function using their respective terminal IDs may coincide with each other.

As a result, among terminals having the same start position of search space of component band 1, not only the search spaces of component band 1 coincides (overlaps), but also all the search spaces of component bands from component band 2 onward coincide with each other. Therefore, CCE allocation in base station 100 is limited and the degree of freedom of CCE allocation decreases.

Thus, according to the present setting method, allocation section 105 causes an offset (CCE spacing) in search space start positions between a plurality of component bands set in respective terminals to differ between the plurality of terminals. This will be described more specifically below.

As in the case of setting method 1, allocation section 105 calculates CCE number $S_n$ which is the start position of a search space of n-th component band n (n=1, 2, ...) from hash function $h(N_{UEID})$ mod $N_{CCE,n}$ and sets CCEs of CCE numbers $S_n$ to $(S_n+(L-1))$ mod $N_{CCE,n}$ as the search space of component band n.

Allocation section 105 then sets CCE number $S_{n+1}$ which is the start position of the search space of (n+1)-th component band (n+1) in $(S_n+M+L)$ mod $N_{CCE,n}$. Here, (M+L) is an offset of the start position of the search space (CCE spacing between the search space start positions of component band n and component band (n+1)) and M is a random value which differs from one terminal to another. For example, suppose M=$(N_{UEID})$ mod $(N_{CCE,n}-2L)$. In this case, since the maximum value of M is $N_{CCE,n}-2L-1$, performing a modulo calculation causes the search space of component band (n+1) to return to CCE #0 never overlapping the search space of component band n.

Allocation section 105 then sets CCEs of CCE numbers $S_{n+1}$ to $(S_{n+1}+(L-1))$ mod $N_{CCE,n+1}$ as search spaces of component band (n+1) as with setting method 1.

Figure 6:
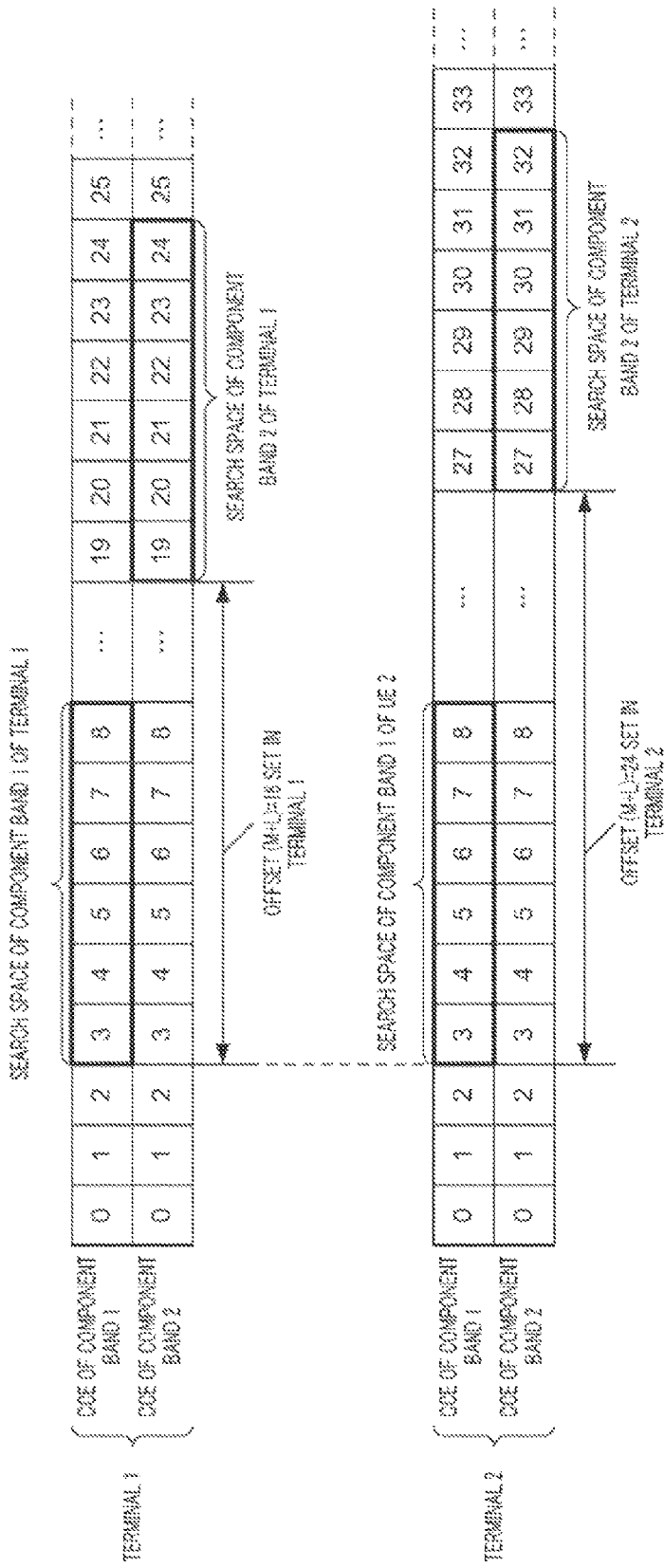
FIG. 6 is a diagram illustrating a method of setting a search space of each component band according to Embodiment 1 of the present invention.

To be more specific, as shown in FIG. 6, a case will be described where component band 1 and component band 2 are set in both terminal 1 and terminal 2. Furthermore, suppose CCE number $S_1$ of the start position of the search space of component band 1 set in terminal 1 and terminal 2 is the same CCE #3. Furthermore, suppose the number of CCEs L that make up the search space is 6, and M set in terminal 1 is 10 and M set in terminal 2 is 18. Thus, suppose offset (M+L) set in terminal 1 is 16 and offset (M+L) set in terminal 2 is 24. Offset (M+L) set in each terminal may be notified to each terminal using, for example, a control channel or PDSCH.

Thus, as shown in FIG. 6, allocation section 105 sets CCEs #3 to #8 (=(3+(6-1)) mod $N_{CCE,1}$) as the search space of component band 1 set in terminal 1 and terminal 2 respectively.

Here, since offset (M+L) set in terminal 1 is 16, allocation section 105 sets the CCE number of the start position of the search space of component band 2 set in terminal 1 to #19 (=(3+10+6) mod $N_{CCE,n}$) as shown in FIG. 6. Allocation section 106 then sets CCE #19 to #24 (=(19+(6-1)) mod $N_{CCE,2}$) as the search space of component band 2 set in terminal 1.

On the other hand, since offset (M+L) set in terminal 2 is 24, allocation section 105 sets the CCE number of the start position of the search space of component band 2 set in terminal 2 to #27 (=(3+24) mod $N_{CCE,n}$) as shown in FIG. 6. Allocation section 106 then sets CCEs #27 to #32 (=(27+(6-1)) mod $N_{CCE,2}$) as the search space of component band 2 set in terminal 2.

Thus, as shown in FIG. 6, even when the start positions of the search spaces of component band 1 set in terminal 1 and terminal 2 are the same (when search spaces (CCEs #3 to #8) of component band 1 overlap each other), the start positions of the search spaces of component band 2 set in terminal 1 and terminal 2 are different. Thus, when, for example, terminal 2 uses all CCEs in the search space of component band 1, terminal 1 cannot use CCEs in the search space of component band 1, whereas terminal 1 can use CCEs in the search space of component band 2.

As shown in FIG. 6, in each terminal, the search space of component band 1 and the search space of component band 2 are made up of CCEs of different CCE numbers as with setting method 1.

On the other hand, as with allocation section 105 according to the present setting method, PDCCH receiving section 207 of terminal 200 identifies a search space of a component band set in the terminal using offset M of the terminal notified from base station 100 and blind-decodes only CCEs in the identified search space of each component band.

By this means, according to the present setting method, the base station causes an offset in the search space start position between a plurality of component bands set in the terminals to differ from one terminal to another. Even when search spaces of some component bands overlap with those of another terminal and CCE allocation is thereby limited, each terminal is more likely to be able to allocate CCEs without the search space of the other component band overlapping the search spaces of the other terminal. That is, according to the present setting method, it is possible to relax limitations on CCE allocation between a plurality of terminals and also relax limitations on CCE allocation between a plurality of component bands set in the respective terminals as with setting method 1. Therefore, according to the present setting method, it is possible to perform CCE allocation more flexibly than arrangement method 1.

The methods 1 and 2 of setting search spaces in allocation section 105 have been described so far.

Thus, according to the present embodiment, even when wideband transmission is performed only on a downlink, it is possible to flexibly perform CCE allocation without collision of ACK/NACK signals between a plurality of component bands.

A case has been described with the present embodiment where the base station sets a search space of another downlink component band with reference to a downlink component band of component band 1 out of a plurality of downlink component bands. However, the present invention may also use an anchor band as a reference component band.

Embodiment 2

In the present embodiment, the base station will set search spaces for a plurality of downlink component bands independently of each other.

Setting section 101 of base station 100 (FIG. 1) according to the present embodiment sets different terminal IDs for every plurality of component bands set in each terminal. Setting section 101 then outputs setting information indicating terminal ID of each component band set in each terminal to allocation section 105.

Allocation section 105 sets search spaces for every plurality of component bands set in each terminal using terminal IDs for every plurality of component bands set in each terminal indicated in setting information inputted from setting section 101. To be more specific, allocation section 105 calculates search spaces per component band from CCE numbers calculated using a hash function which receives terminal IDs set per component band as input and the number of CCEs (L) making up the search space.

On the other hand, setting information indicating terminal IDs for every plurality of component bands set in terminal 200 set by setting section 101 of base station 100 is notified to terminal 200 (FIG. 2). PDCCH receiving section 207 of terminal 200 identifies search spaces of respective component bands using terminal IDs per component band set in the terminal as with allocation section 105. PDCCH receiving section 207 blind-decodes CCEs in a search space of each identified component band.

Next, the method of setting search spaces by allocation section 105 will be described in detail. Here, suppose terminal ID of component band n set by setting section 101 is $N_{UEID,n}$.

Allocation section 105 calculates CCE number $S_n$ which is the start positions of search spaces of a plurality of component bands n (n=1, 2, ...) set in terminal 200 from a hash function $h(N_{UEID,n})$ mod $N_{CCE,n}$. Allocation section 105 then sets CCEs of CCE numbers $S_n$ to $(S_n+(L-1))$ mod $N_{CCE,n}$ as a search space of component band n.

Thus, search spaces for every plurality of component bands set in each terminal are set per terminal and per component band independently of each other (that is, randomly).

Figure 7:
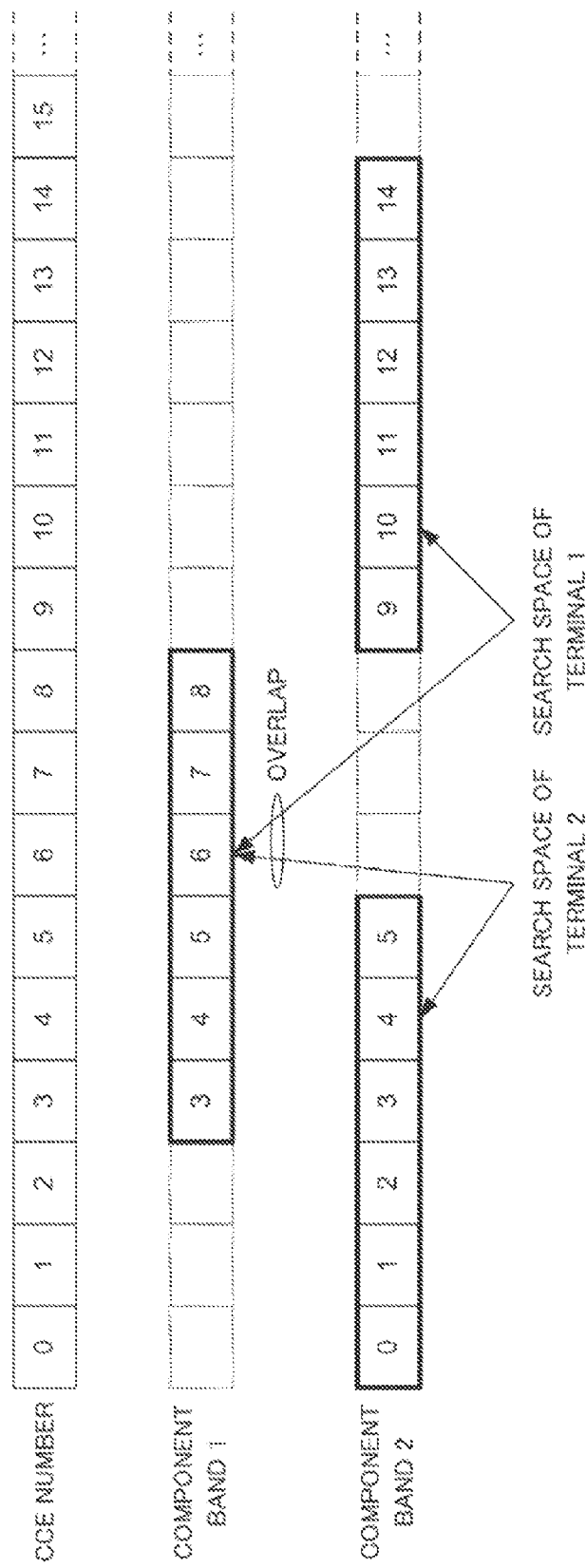
FIG. 7 is a diagram illustrating a method of setting a search space of each component band according to Embodiment 2 of the present invention.

For example, as shown in FIG. 7, a case will be described where component band 1 and component band 2 are set for both terminal 1 and terminal 2. Here, setting section 101 sets different terminal IDs for component band 1 and component band 2 set in terminal 1. Likewise, setting section 101 sets different terminal IDs for component band 1 and component band 2 set in terminal 2. In FIG. 7, suppose the number of CCEs L making up a search space is 6.

Allocation section 105 calculates CCE number $S_1$ which is the start position of the search space of component band 1 set in terminal 1 from a hash function $h(N_{UEID,1})$ mod $N_{CCE,1}$ (CCE #3 in FIG. 7). Allocation section 105 sets CCEs (CCE #3 to CCE #8 in FIG. 7) of CCE numbers $S_1$ to $(S_1+(L-1))$ mod $N_{CCE,1}$ as the search space of component band 1 set in terminal 1. Likewise, allocation section 105 calculates CCE number $S_2$ which is the start position of the search space of component band 2 set in terminal 1 from a hash function $h(N_{UEID,2})$ mod $N_{CCE,2}$ (CCE #9 in FIG. 7). Allocation section 105 then sets CCEs (CCE #9 to CCE #14 in FIG. 7) of CCE numbers $S_2$ to $(S_2+(L-1))$ mod $N_{CCE,2}$ as the search space of component band 2 set in terminal 1. For terminal 2, allocation section 105 likewise sets a search space of component band 1 (CCE #3 to CCE #8 in FIG. 7) and a search space of component band 2 (CCE #0 to CCE #5 in FIG. 7) independently of each other.

When allocation section 105 sets search spaces of component band 1 and component band 2 in both terminal 1 and terminal 2 independently of each other, the search spaces of the respective terminals may overlap each other in a certain component band (component band 1 in FIG. 7) as shown in FIG. 7. However, since allocation section 105 sets search spaces of the respective component bands between terminals and component bands independently (irrelevantly) of each other, it is less likely that search spaces of component bands other than a component band in which search spaces of each terminal overlap each other will also overlap each other. That is, in the search spaces of component bands other than the component bands in which search spaces of each terminal overlap each other, it is more likely that CCEs can be used without being limited by CCE allocation with other terminals or component bands. Thus, the present embodiment can reduce the possibility that data transmission will be limited due to limitations on CCE allocation and thereby improve data throughput.

By this means, according to the present embodiment, the base station sets search spaces for every plurality of component bands set in each terminal per component band independently of each other. Even when wideband transmission is performed only on a downlink, it is thereby possible to flexibly allocate CCEs without collision of ACK/NACK signals between a plurality of terminals and a plurality of component bands.

Embodiment 3

The present embodiment will set search spaces of specific downlink component bands out of a plurality of downlink component bands based on output of a hash function used to set the start positions of search spaces of downlink component bands other than the specific downlink component bands.

Figure 8:
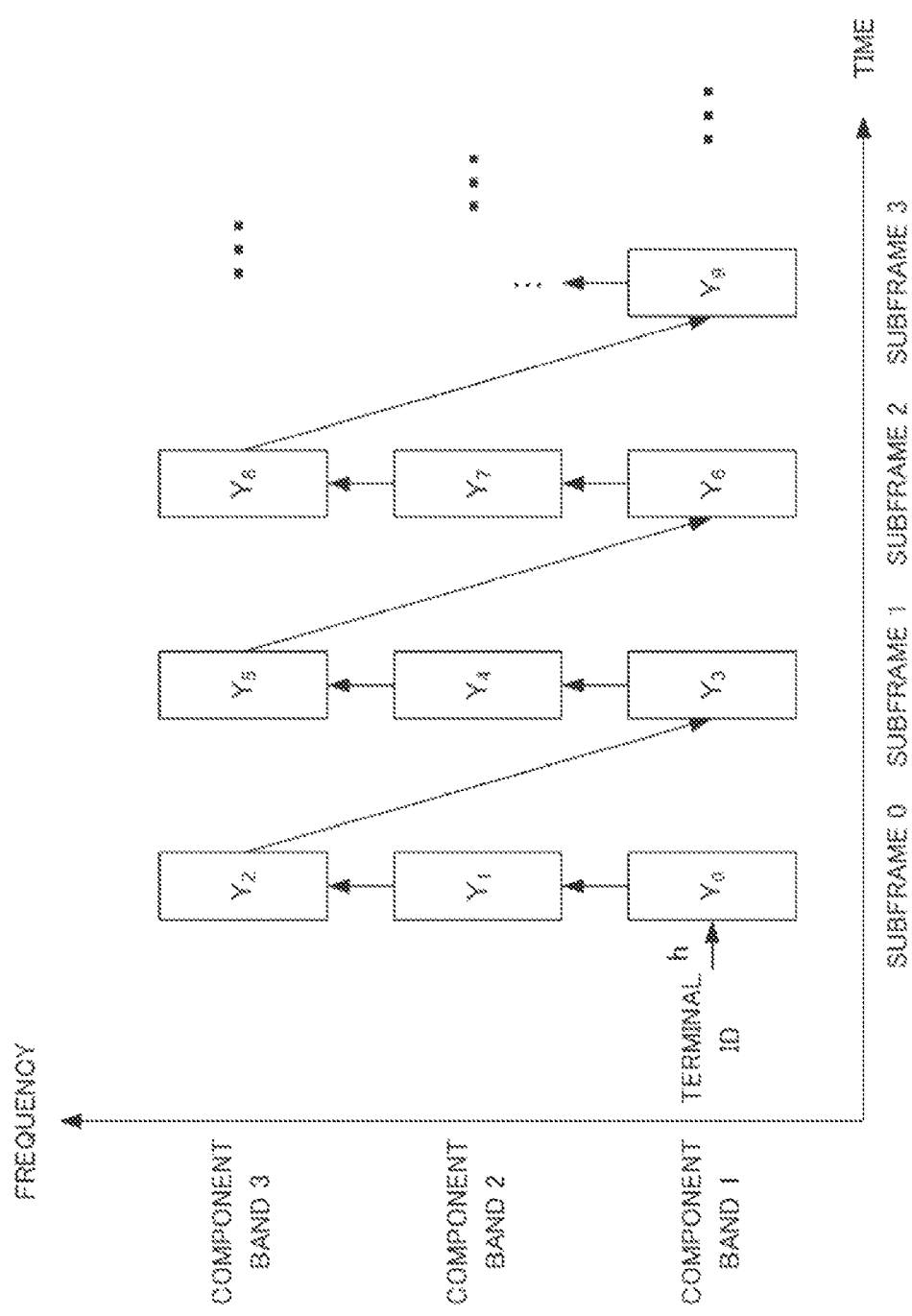
FIG. 8 is a diagram illustrating a method of setting a search space start position of each component band according to Embodiment 3 of the present invention.

In the following descriptions, as in the cases of Embodiment 1 and Embodiment 2, CCEs of CCE numbers $S_n$ to $(S_n+(L-1))$ mod $N_{CCE,n}$ are set as a search space of component band n. Furthermore, as shown in FIG. 8, suppose component bands set in terminal 200 (FIG. 2) are component bands 1 to 3. Hereinafter, a method of setting the start position of a search space per component band will be described.

Allocation section 105 calculates CCE number $S_n$ which is the start position of a search space of component band n set in terminal 200 from hash function $h(N_{UEID})$ mod $N_{CCE,n}$. Here, suppose the output result of hash function $h(N_{UEID})$ is $Y_n$.

Next, allocation section 105 calculates CCE number $S_n$ which is the start position of a search space of component band (n+1) set in terminal 200 from hash function $h(Y_n)$ mod $N_{CCE,n+1}$. Here, suppose the output result of hash function $h(Y_n)$ is $Y_{n+1}$.

That is, as shown, for example, in FIG. 8, allocation section 105 sets CCE number $S_0$ which is the start position of the search space of component band 1 using output $Y_0$ of hash function h(terminal ID (that is, $N_{UEID}$)) in subframe 0. Furthermore, allocation section 105 sets CCE number $S_2$ which is the start position of the search space of component band 2 using output $Y_1$ of hash function $h(Y_0)$ and sets CCE number $S_3$ which is the start position of the search space of component band 3 using output $Y_2$ of hash function $h(Y_1)$. That is, allocation section 105 sets the search space of a specific component band based on the output of a hash function used to set the start positions of search spaces of component bands other than the specific downlink component band.

Thus, allocation section 105 according to the present embodiment sets a search space per downlink component band using a hash function in the same way as in Embodiment 2. That is, allocation section 105 according to the present embodiment sets search spaces for every plurality of downlink component bands independently of (randomly) each other per downlink component band in the same way as in Embodiment 2. Furthermore, allocation section 105 delivers the output of the hash function used in each component band to another component band and designates the output of the hash function as input of a hash function in another component band between a plurality of component bands (component bands 1 to 3 shown in FIG. 8). For this reason, one terminal ID used as input to the initial (component band 1 of subframe 0 in FIG. 8) hash function suffices as terminal ID to be set in each terminal.

Furthermore, allocation section 105 performs the above processing on each subframe (subframes 0, 1, 2, 3, ... in FIG. 8). However, as shown in FIG. 8, allocation section 105 calculates a search space start position of component band 0 of subframe 1 using output $Y_3$ of hash function $h(Y_2)$ which receives output $Y_2$ of the hash function used to calculate the search space start position of component band 3 of subframe 0 as input. That is, allocation section 105 calculates the start position of the search space of component band 1 of subframe k using the output of the hash function used to calculate the search space start position of component band N of subframe k−1. Here, N is the number of component bands set in the terminal. This causes search spaces to be randomly set between component bands and subframes.

By this means, the present embodiment can obtain effects similar to those of Embodiment 2, and also eliminates the necessity of setting a plurality of terminal IDs in each terminal, and can thereby reduce the number of terminal IDs used for each terminal to a necessary minimum. It is thereby possible to allocate a sufficient number of terminal IDs to more terminals in the system. Furthermore, as with LTE, the present embodiment sets search spaces of different component bands and different subframes using one hash function, and can thereby configure a simple base station and terminal.

Figure 9:
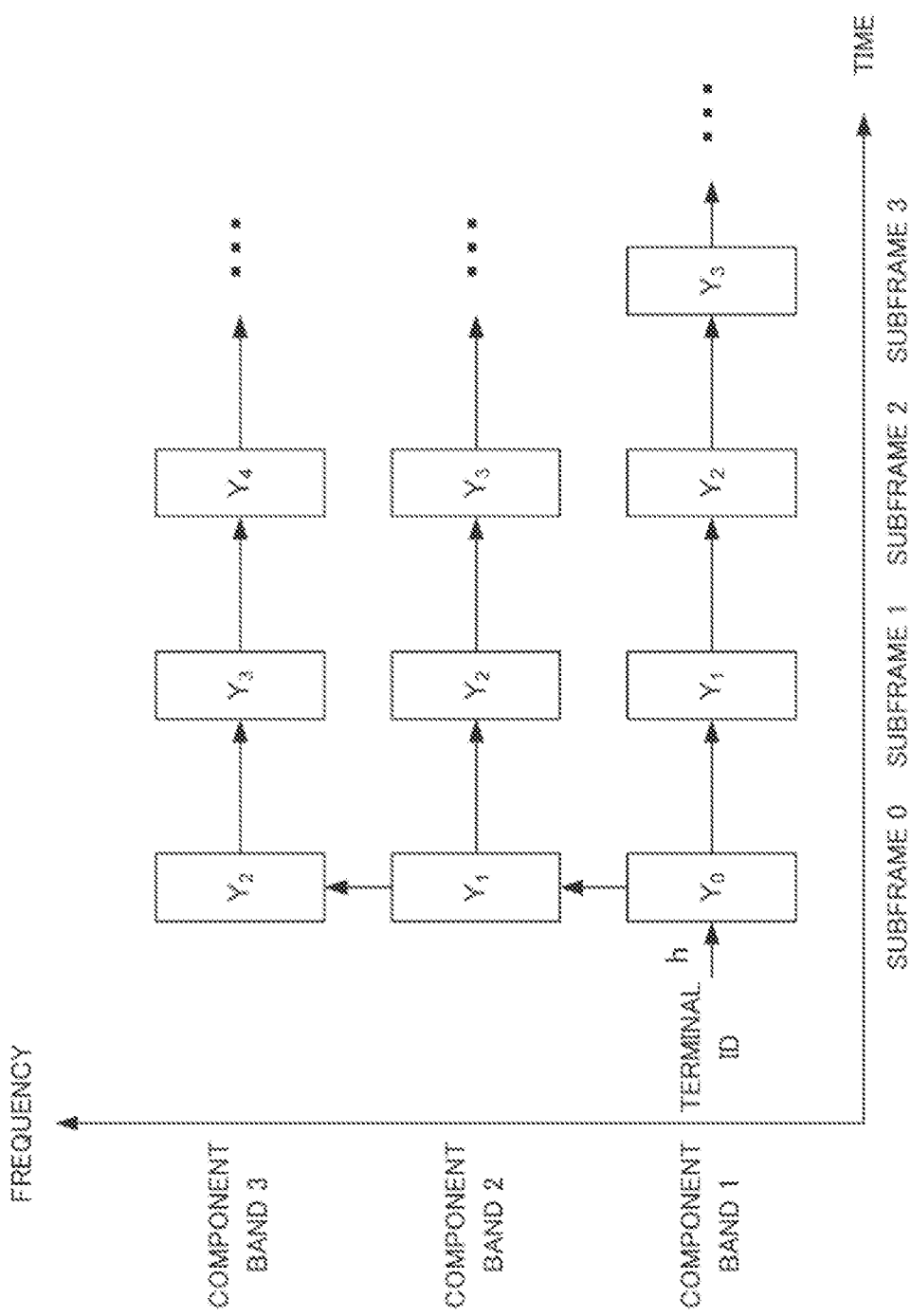
FIG. 9 is a diagram illustrating another method of setting a search space start position of each component band according to Embodiment 3 of the present invention.

In the present embodiment, allocation section 105 may also set search spaces per component band as shown in FIG. 9 instead of FIG. 8. To be more specific, as shown in FIG. 9, allocation section 105 calculates the start positions of search spaces of component bands 1 to 3 in subframe 0 as with FIG. 8. Next, as shown in FIG. 9, allocation section 105 uses output of a hash function of an immediately preceding subframe of each component band (that is, subframe 0) as input of a hash function in component bands 1 to 3 of subframe 1. That is, allocation section 105 delivers the output of the hash function between component bands in an initial subframe (subframe 0 in FIG. 9) and delivers the output of the hash function between subframes in the same component band from the next subframe onward (from subframe 1 onward in FIG. 9). In the initial subframe shown in FIG. 9, a case has been described where the output of the hash function is delivered between component bands. However, as the value delivered in the initial subframe, not only the output of the hash function but also a value calculated from terminal Id and a component band number (e.g., value resulting from adding the component band number to terminal ID) may be delivered between component bands. Thus, base station 100 can set search spaces in each subframe between terminals and component bands independently of each other as with the present embodiment (FIG. 8), and can thereby obtain effects similar to those of Embodiment 2.

Embodiments of the present invention have been described so far.

A case has been described in the above embodiments where the number of CCEs occupied by one PDCCH (CCE aggregation level) is one. However, even when one PDCCH occupies a plurality of CCEs (when the CCE aggregation level is 2 or more), it is possible to obtain effects similar to those of the present invention. Furthermore, it is also possible to calculate search spaces according to the CCE aggregation level occupied by one PDCCH and change the number of CCEs L making up a search space depending on the CCE aggregation level.

Furthermore, CCEs described in the above embodiments are logical resources and when CCEs are arranged in actual physical time/frequency resources, CCEs are arranged distributed to all bands in a component band. Furthermore, CCEs may also be arranged in actual physical time/frequency resources distributed to the entire system band (that is, all component bands) as long as CCEs are at least divided per component band as logical resources.

Furthermore, the present invention may use C-RNTI (Cell-Radio Network Temporary Identifier) as a terminal ID.

The present invention may perform a multiplication between bits (that is, between CRC bits and terminal IDs) or sum up bits and calculate mod 2 of the addition result (that is, remainder obtained by dividing the addition result by 2) as masking (scrambling) processing.

Furthermore, a case has been described in the above embodiments where a component band is defined as a band having a width of maximum 20 MHz and as a basic unit of communication bands. However, the component band may be defined as follows. For example, the downlink component band may also be defined as a band delimited by downlink frequency band information in a BCH (Broadcast Channel) broadcast from the base station, a band defined by a spreading width when a PDCCH is arranged distributed in a frequency domain or a band in which an SCH (synchronization channel) is transmitted in a central part. Furthermore, the uplink component band may also be defined as a band delimited by uplink frequency band information in a BCH broadcast from the base station or a basic unit of communication band having 20 MHz or less including a PUSCH in the vicinity of the center and PUCCHs (Physical Uplink Control Channel) at both ends.

Furthermore, although a case has been described in the above embodiments where the communication bandwidth of a component band is 20 MHz, the communication bandwidth of a component band is not limited to 20 MHz.

Furthermore, band aggregation may also be called "carrier aggregation." Furthermore, a component band may also be called "unit carrier (component carrier(s))" in LTE. Furthermore, band aggregation is not limited to a case where continuous frequency bands are aggregated, but discontinuous frequency bands may also be aggregated.

Furthermore, a component band of one or a plurality of uplinks set in each terminal by the base station may be called "UE UL component carrier set" and a component band of a downlink may be called "UE DL component carrier set."

Furthermore, the terminal may also be called "UE" and the base station may also be called "Node B or BS (Base Station)." Furthermore, the terminal ID may also be called "UE-ID."

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-281391, filed on Oct. 31, 2008, including the specification, drawings and abstract is incorporated herein by reference in its entirety.

INDUSTRIAL APPLICABILITY

The present invention is applicable to a mobile communication system or the like.

The invention claimed is:

1. An integrated circuit comprising:
receiving circuitry, which, in operation, receives a downlink control channel transmitted on a control channel element (CCE) in a first search space that is comprised of a plurality of CCEs, wherein the downlink control channel includes resource assignment information indicating a resource allocated to a terminal apparatus in a component carrier n ($CC_n$) out of one or multiple component carrier(s) (CC(s)) that are configured to the terminal apparatus; and
transmitting circuitry, which, in operation, transmits a ACK/NACK signal on an uplink control channel, an index of which is associated with a CCE number of the CCE on which the downlink control channel is transmitted,
wherein the first search space, in which the downlink control channel including the resource assignment information indicating the resource allocated in the $CC_n$ is transmitted, is comprised of the plurality of CCEs depending on the value of n, and
wherein a CCE number that defines an end position of the first search space for the $CC_n$ and a CCE number that defines a start position of a second search space for a component carrier n+1 ($CC_{n+1}$) are consecutive, the second search space being different from the first search space.

2. The integrated circuit according to claim 1, comprising:
at least one input coupled to the receiving circuitry, wherein the at least one input, in operation, inputs the downlink control channel; and
at least one output coupled to the transmitting circuitry, wherein the at least one output, in operation, outputs the ACK/NACK signal.

3. The integrated circuit according to claim 1, wherein a number of CC(s) configured for downlink for the terminal apparatus is greater than a number of CC(s) configured for uplink for the terminal apparatus.

4. The integrated circuit according to claim 1, wherein at least one of the one or multiple CC(s) configured for downlink for the terminal apparatus is also configured for uplink for the terminal apparatus.

5. The integrated circuit according to claim 1, wherein multiple search spaces for the multiple CCs neighbor each other.

6. The integrated circuit according to claim 1, wherein a CCE number $S_{n+1}$, which defines a start position of the second search space for a component carrier n+1 ($CC_{n+1}$), is set as $(S_n+L)$ mod $N_{CCE}$, where, for the $CC_n$, a CCE number $S_n$ defines a start position of the first search space, L is a number of CCEs that form the first search space, and $N_{CCE}$ is a total number of CCEs within the $CC_n$.

7. The integrated circuit according to claim 1, wherein a difference between CCE numbers that respectively define start positions of the search spaces for the multiple CCs configured for the terminal apparatus, varies among a plurality of terminals.

8. The integrated circuit according to claim 1, wherein multiple search spaces for the multiple CCs are set independently of each other.

9. The integrated circuit according to claim 1, wherein said transmitting circuitry, in operation, transmits multiple ACK/NACK signals, which are for the multiple CCs configured for the terminal apparatus, in one of the multiple CCs configured for the terminal apparatus.

10. The integrated circuit according to claim 1, wherein the plurality of CCEs that form the first search space correspond to downlink control channel candidates to be decoded by the terminal apparatus.

11. The integrated circuit according to claim 1, wherein the search space is comprised of the plurality of CCEs having consecutive CCE numbers.

12. The integrated circuit according to claim 2, wherein the at least one output and the at least one input, in operation, are coupled to an antenna.

13. An integrated circuit comprising:
at least one input; and
circuitry coupled to the at least one input, wherein the circuitry, in operation:
controls reception of a downlink control channel transmitted on a control channel element (CCE) in a first search space that is comprised of a plurality of CCEs, wherein the downlink control channel includes resource assignment information indicating a resource allocated to a terminal apparatus in a component carrier n ($CC_n$) out of one or multiple component carrier(s) (CC(s)) that are configured to the terminal apparatus; and
controls transmission of a ACK/NACK signal on an uplink control channel, an index of which is associated with a CCE number of the CCE on which the downlink control channel is transmitted,
wherein the first search space, in which the downlink control channel including the resource assignment information indicating the resource allocated in the $CC_n$ is transmitted, is comprised of the plurality of CCEs depending on the value of n, and
wherein a CCE number that defines an end position of the first search space for the $CC_n$ and a CCE number that defines a start position of a second search space for a component carrier n+1 ($CC_{n+1}$) are consecutive, the second search space being different from the first search space.

14. The integrated circuit according to claim 13, comprising, at least one output coupled to the circuitry, wherein the at least one output, in operation, outputs the ACK/NACK signal.

15. The integrated circuit according to claim 13, wherein a number of CC(s) configured for downlink for the terminal apparatus is greater than a number of CC(s) configured for uplink for the terminal apparatus.

16. The integrated circuit according to claim 13, wherein at least one of the one or multiple CC(s) configured for downlink for the terminal apparatus is also configured for uplink for the terminal apparatus.

17. The integrated circuit according to claim 13, wherein multiple search spaces for the multiple CCs neighbor each other.

18. The integrated circuit according to claim 13, wherein a CCE number $S_{n+1}$, which defines a start position of the second search space for a component carrier n+1 ($CC_{n+1}$), is set as $(S_n+L) \mod N_{CCE}$, where, for the $CC_n$, a CCE number $S_n$ defines a start position of the first search space, L is a number of CCEs that form the first search space, and $N_{CCE}$ is a total number of CCEs within the $CC_n$.

19. The integrated circuit according to claim 13, wherein a difference between CCE numbers that respectively define start positions of the search spaces for the multiple CCs configured for the terminal apparatus, varies among a plurality of terminals.

20. The integrated circuit according to claim 13, wherein multiple search spaces for the multiple CCs are set independently of each other.

21. The integrated circuit according to claim 13, wherein said transmitting circuitry, in operation, transmits multiple ACK/NACK signals, which are for the multiple CCs configured for the terminal apparatus, in one of the multiple CCs configured for the terminal apparatus.

22. The integrated circuit according to claim 13, wherein the plurality of CCEs that form the first search space correspond to downlink control channel candidates to be decoded by the terminal apparatus.

23. The integrated circuit according to claim 13, wherein the search space is comprised of the plurality of CCEs having consecutive CCE numbers.

24. The integrated circuit according to claim 14, wherein the at least one output and the at least one input, in operation, are coupled to an antenna.

* * * * *